United States Patent [19]
Wu

[11] Patent Number: 6,000,712
[45] Date of Patent: Dec. 14, 1999

[54] FOLDING COLLAPSIBLE GOLF CART

[76] Inventor: David Wu, No. 35-1, Jin Hsin St., Taipei Hsien, Taiwan

[21] Appl. No.: 09/044,073

[22] Filed: Mar. 19, 1998

[51] Int. Cl.⁶ ........................................................ B62B 1/00
[52] U.S. Cl. ................ 280/639; 280/47.34; 280/DIG. 6; 280/793; 280/655.1
[58] Field of Search ................................. 280/79.2, 79.3, 280/79.11, 47.371, 47.34, 651, 641, 639, 35, 638, DIG. 6, 87.021, 655.1, 39

[56] References Cited

U.S. PATENT DOCUMENTS

| | | |
|---|---|---|
| 639,338 | 9/1899 | Barns . |
| 1,358,235 | 11/1920 | Nylin . |
| 2,212,053 | 8/1940 | Smith ........................................ 280/36 |
| 2,414,941 | 1/1947 | Freis ............................... 280/DIG. 6 X |
| 2,438,078 | 3/1948 | Sutphen ......................... 280/DIG. 6 X |
| 4,659,096 | 4/1987 | Leimgruber ............................... 280/39 |
| 5,294,158 | 3/1994 | Cheng ..................................... 280/641 |
| 5,409,253 | 4/1995 | Ying-Hsiung Cheng ..... 280/DIG. 6 X |
| 5,516,142 | 5/1996 | Hartan .............................. 280/655.1 X |
| 5,558,359 | 9/1996 | Phears ................................ 280/79.3 X |

FOREIGN PATENT DOCUMENTS

| | | | |
|---|---|---|---|
| 1654090 | 6/1991 | Germany ............................. 280/47.34 |
| 3502194 | 7/1986 | U.S.S.R. .............................. 280/79.11 |

*Primary Examiner*—Lanna Mai
*Assistant Examiner*—Joan To
*Attorney, Agent, or Firm*—Vardell & Vardell, PLLC

[57] ABSTRACT

A folding collapsible golf cart includes a U-shaped base frame, a U-shaped upright frame pivoted to the base frame and turned between a horizontal position and a vertical position, a brace member pivoted to the base frame for supporting the upright frame in the vertical position, a U-shaped handle pivoted to the upright frame and turned between a first position where the handle and the upright frame are longitudinally aligned, and a second position where the handle is collapsed and closely attached to the upright frame, two front wheels and two rear wheels respectively mounted on the base frame and the upright for supporting the folding collapsible golf cart on the ground, a bottom golf bag cradle and a top golf bag cradle respectively mounted on the base frame and the upright frame for holding a golf cart.

2 Claims, 8 Drawing Sheets

FOLDING COLLAPSIBLE GOLF CART

BACKGROUND AND SUMMARY OF THE INVENTION

The present invention relates to a golf cart carrying a golf bag, and more particularly to a folding collapsible golf cart that can be folded up to minimize space occupation when not in use.

A conventional golf cart, as shown in FIG. 1, comprises an upper golf bag cradle and a lower golf bag cradle fixedly mounted on the main shaft thereof for holding a golf bag therebetween. The upper golf bag cradle and the lower golf bag cradle are equipped with a respective cradle strap for securing the golf bag to the cradles. When in use, the cradle straps must be unfastened so that the golf bag can be rested on the cradles. After loading, the cradle straps are respectively fastened up to firmly secure the golf bag in place. This golf bag installation procedure in complicated.

The present invention has been accomplished to provide a folding collapsible golf cart which eliminates the aforesaid drawback. According to one aspect of the present invention, the folding collapsible golf cart is comprised of a U-shaped base frame, a U-shaped upright frame pivoted to the base frame and turned between a horizontal position and a vertical position, a brace member pivoted to the base frame for supporting the upright frame in the vertical position, a U-shaped handle pivoted to the upright frame and turned between a first position where the handle and the upright frame are longitudinally aligned, and a second position where the handle is collapsed and closely attached to the upright frame, two front wheels and two rear wheels respectively mounted on the base frame and the upright for supporting the folding collapsible golf cart on the ground, a bottom golf bag cradle and a top golf bag cradle respectively mounted on the base frame and the upright frame for holding a golf bag. According to another aspect of the present invention, the bottom golf bag cradle has a bottom sloping downwardly backwards for holding the loaded golf bag in a tilted position; the top golf bag cradle comprises two mounting frames respectively fastened to two ends of the upright frame, two supporting frames respectively pivoted to the mounting frames, the supporting frames each having a smoothly curved supporting face for supporting the loaded golf bag in place, and a connecting device connected between the supporting frames and the mounting frames, the connecting device comprising a front elastic belt and a rear resilient belt connected in parallel between the supporting frames. The supporting frames are forwards outwards by the golf bag when the golf bag is put on the bottom golf bag cradle and the top golf bag cradle. After the golf bag has been set into position, the supporting frames are forced inwards by the connecting device to hold the loaded golf bag firmly in place.

DETAILED DESCRIPTION OF THE PREFERRED EMBODIMENT

Figure 1:
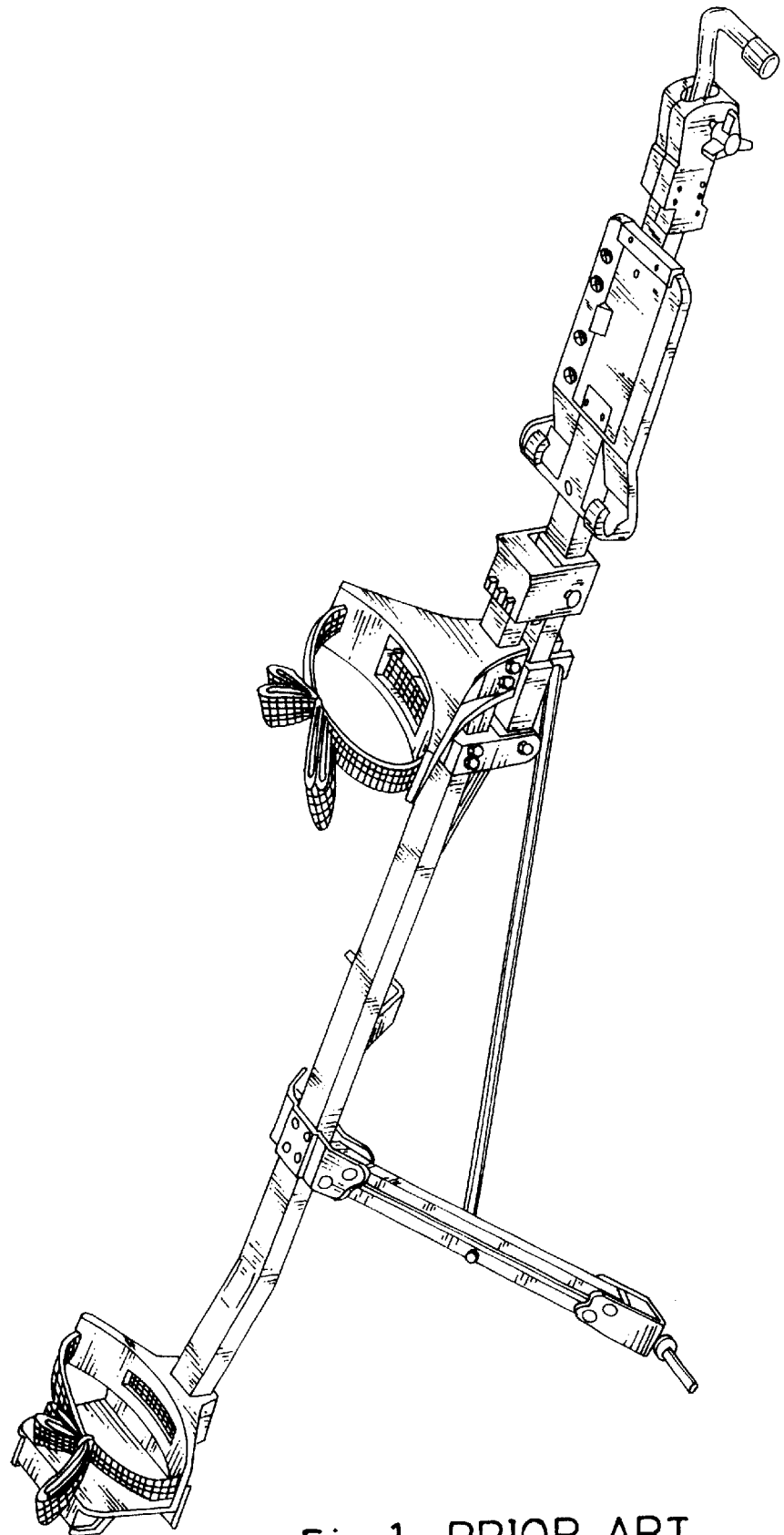
FIG. 1 is a perspective view of the frame assembly of a golf cart according to the prior art.

Referring to Figures from 2 to 8, a folding collapsible golf cart in accordance with the present invention essentially comprises a substantially U-shaped handle 1, a substantially U-shaped upright frame 2, two locating frames 3, a brace member 4, a substantially U-shaped base frame 5, a bottom golf bag cradle 6, a top golf bag cradle 7, two front wheels 53; 54, and two rear wheels 23; 24.

Figure 5:
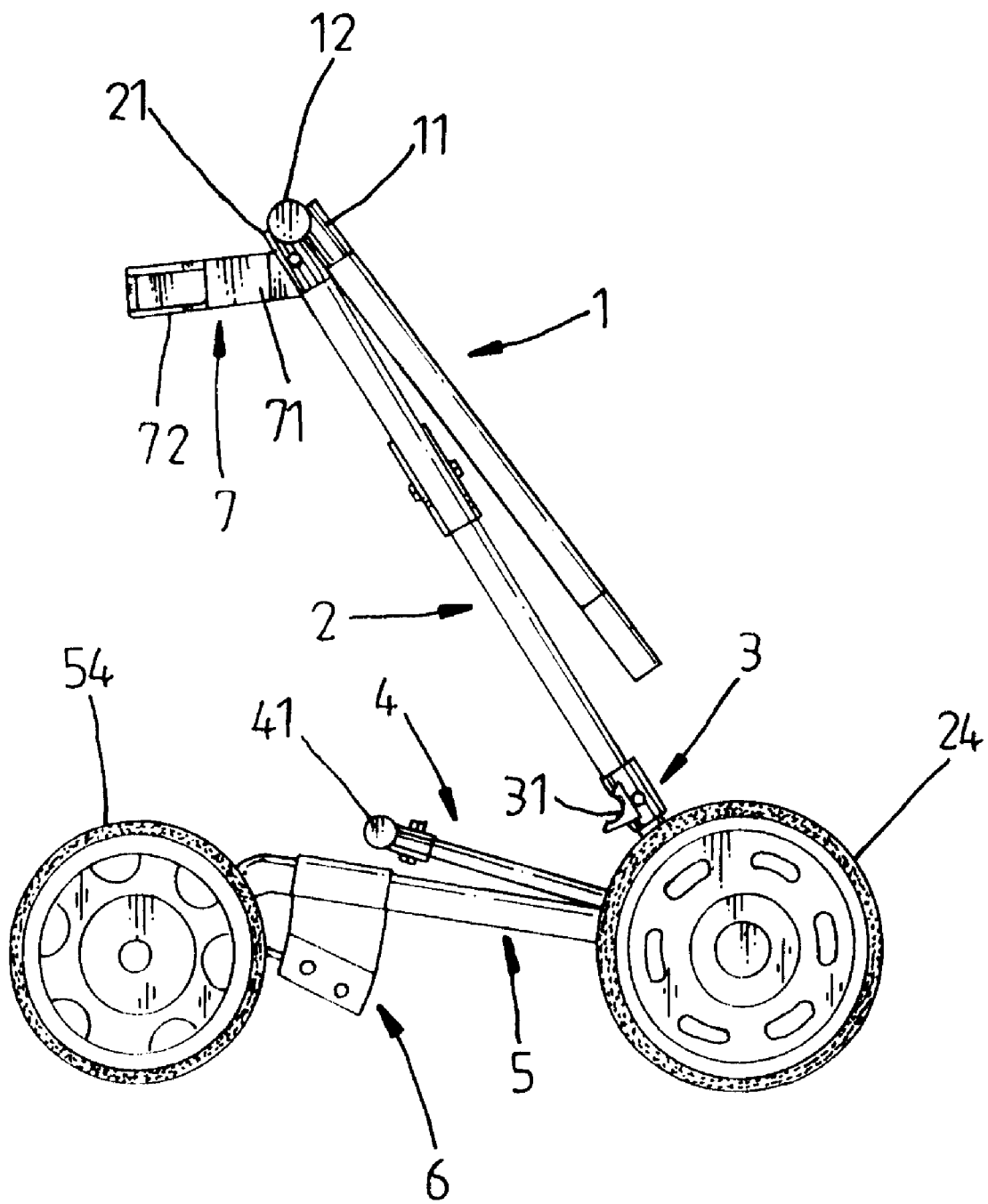
FIG. 5 is similar to FIG. 4 but showing the brace member disconnected from the upright frame, the upright frame and the handle turned downwardly forwards.
Figure 7:
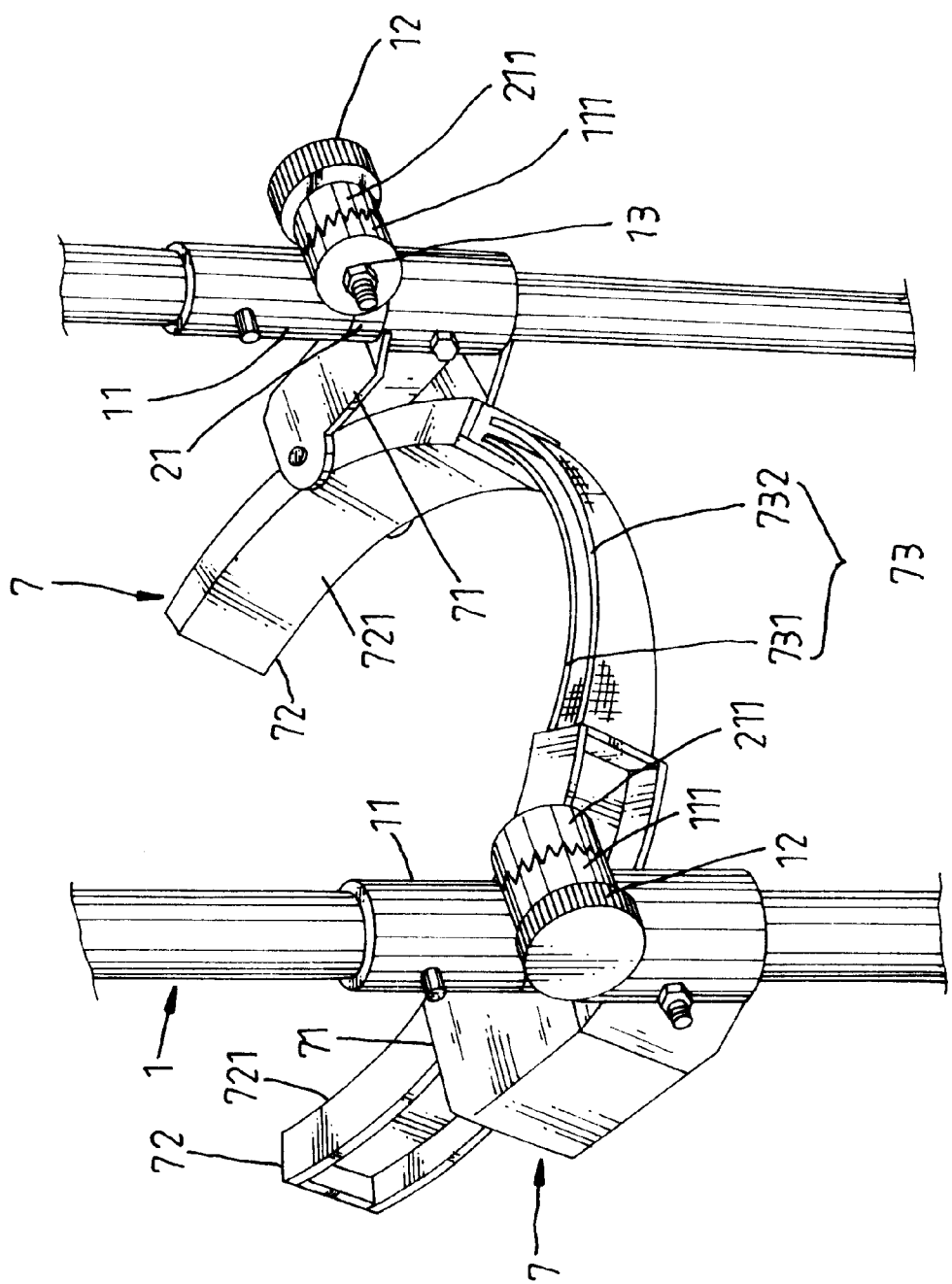
FIG. 7 is a perspective view in an enlarged scale of a part of the present invention, showing the top golf bag cradle mounted on the upright frame, the cylindrical coupling blocks of the handle and the cylindrical coupling blocks of the upright frame tightly fastened together.

The substantially U-shaped base frame 5 is made from a U-shaped frame tube and horizontally disposed at the bottom, having two ends 51 of the two parallel end tube sections 52 thereof respectively pivoted to lugs 22 at the upright frame 2. The substantially U-shaped upright frame 2, is made from a U-shaped frame tube, comprising two mounting blocks 21 at two ends of the two parallel end tube sections thereof, two cylindrical coupling blocks 211 respectively raised from the mounting blocks 21 and defining a respective axial axle hole 2111, and two lugs 22 disposed at two ends of the transversely disposed middle tube section thereof to which the ends 51 of the U-shaped base frame 5 are pivoted respectively. The substantially U-shaped handle 1 is made from a U-shaped frame tube, comprising two mounting blocks 11 at two ends of the two parallel end tube sections thereof, and two cylindrical coupling blocks 111 respectively raised from the mounting blocks 11 and defining a respective axial axle hole 1111. Two adjustment screws 12 are respectively inserted through the axial axle holes 1111; 2111 on the cylindrical coupling blocks 111; 211 and screwed up with a respective nut 13 to secure the coupling blocks 111; 211 together (see FIGS. 2, 7 and 8). The locating frames 3 are respectivelly fixedly fastened to the two parallel end tube sections of the substantially U-shaped upright frame 2 above the lugs 22, having a respective horizontal groove 31 for holding the brace member 4 (see FIG. 5). The brace member 4 comprises a transverse locating frame tube 41 for resting on the horizontal grooves 31 on the locating frames 3, two parallel coupling frame tubes 42 perpendicularly extended from the transverse locating frame tube 41 and respectively pivoted to the two parallel end tube sections 52 of the substantially U-shaped base frame 5. The front wheels 53; 54 are bilaterally mounted on the substantially U-shaped base frame 5 remote from the substantially U-shaped upright frame 2 for supporting the substantially U-shaped base frame 5 on the ground. The rear wheels 23; 24 are bilaterally mounted on the substantially U-shaped upright frame 2 adjacent to the U-shaped base frame 5 for supporting the substantially U-shaped upright frame 2 on the ground. The bottom golf bag cradle 6 and the top golf bag cradle 7 are respectively mounted on the substantially U-shaped base frame 5 and the substantially U-shaped upright frame 2 for securing a golf bag on the folding collapsible golf cart. The bottom golf bag cradle 6 has a bottom 61 sloping downwardly backwards for holding the golf bag in a tilted position. The top golf bag cradle 7 comprises two mounting frames 71 respectively fastened to the ends of the two parallel end tube sections of the substantially U-shaped upright frame 2, two supporting frames 72 respectively pivoted to the mounting frames 71, each supporting frame 72 having a smoothly curved supporting face 721 for supporting the golf bag, and a connecting device 73 connected between the supporting frames 72.

The connecting device 73 is comprised of a front elastic belt 731 and a rear resilient belt 732 connected in parallel between the supporting frames 72. When installed, the supporting frames 72 can be opened outwards for letting the golf bag to be put into position and rested on the smoothly curved supporting faces 721 of the supporting frames 72, and then secured in place by the supporting frames 72.

Figure 8:
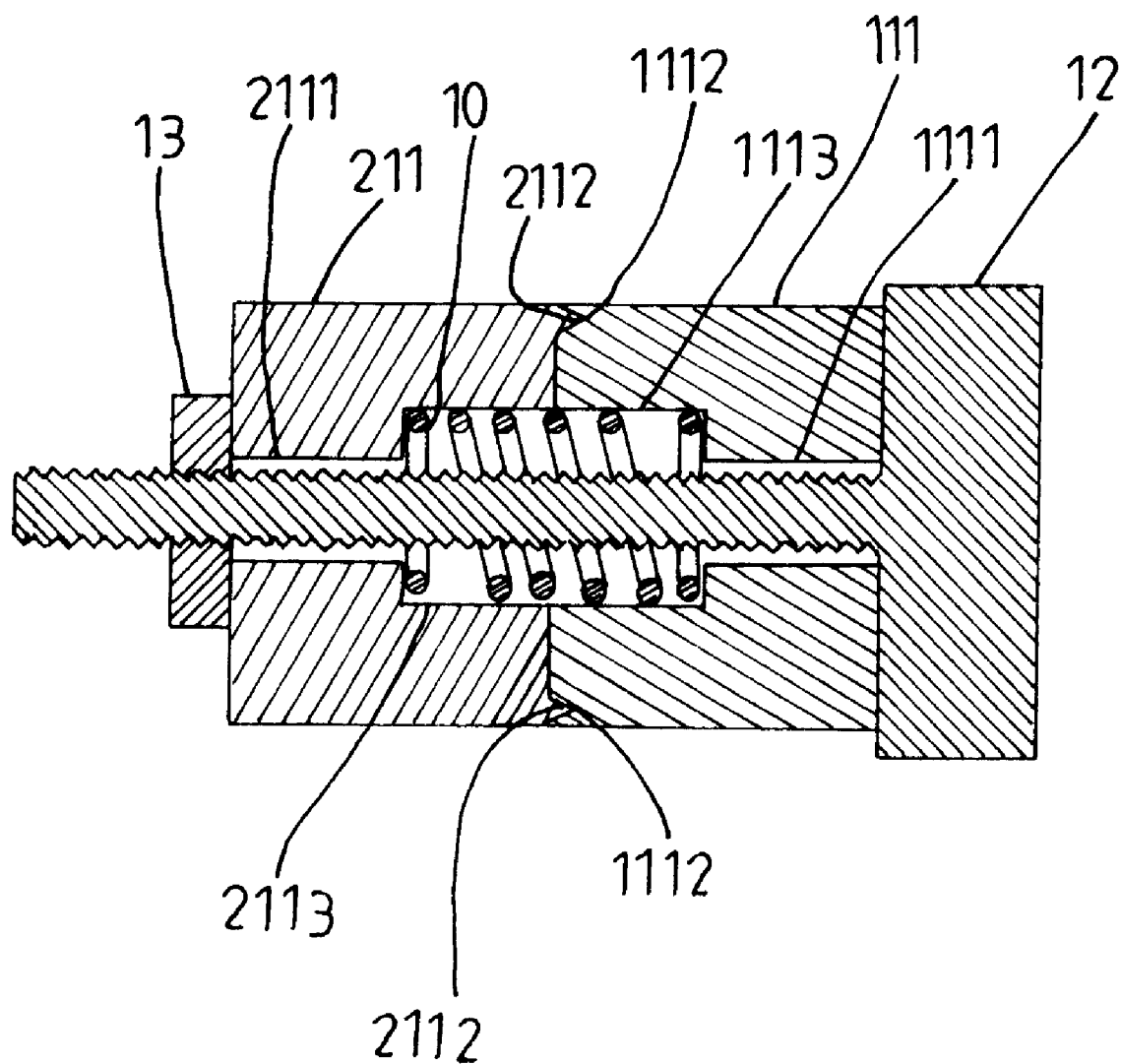
FIG. 8 is a sectional view in an enlarged scale of a part of the present invention, showing the adjustment screw and the nut fastened tight, the spring retained between the cylindrical coupling blocks.

Referring to FIG. 8, the cylindrical coupling block 111 has a front chamber 1113 at the center of its front side, and radial grooves 1112 at its front side; the cylindrical coupling block 211 has a front chamber 2113 at the center of its front side, and radial teeth 2112 at its front side. A spring 10 is mounted in the front chambers 1113; 2113 within the cylindrical coupling blocks 111; 211 around the adjustment screw 12. When the adjustment screw 12 and the nut 13 are fastened tight, the radial teeth 2112 and the radial grooves 1112 are meshed together to stop the cylindrical coupling blocks 111; 211 from rotation motion relative to each other. On the contrary, when the adjustment screw 12 and the nut 13 are loosened, the spring 10 pushes the cylindrical coupling blocks 111; 211 in the reversed directions, thereby causing the radial teeth 2112 to be disengaged from the radial grooves 1112, and therefore the cylindrical coupling blocks 111; 211 can be rotated relative to each other.

Figure 2:
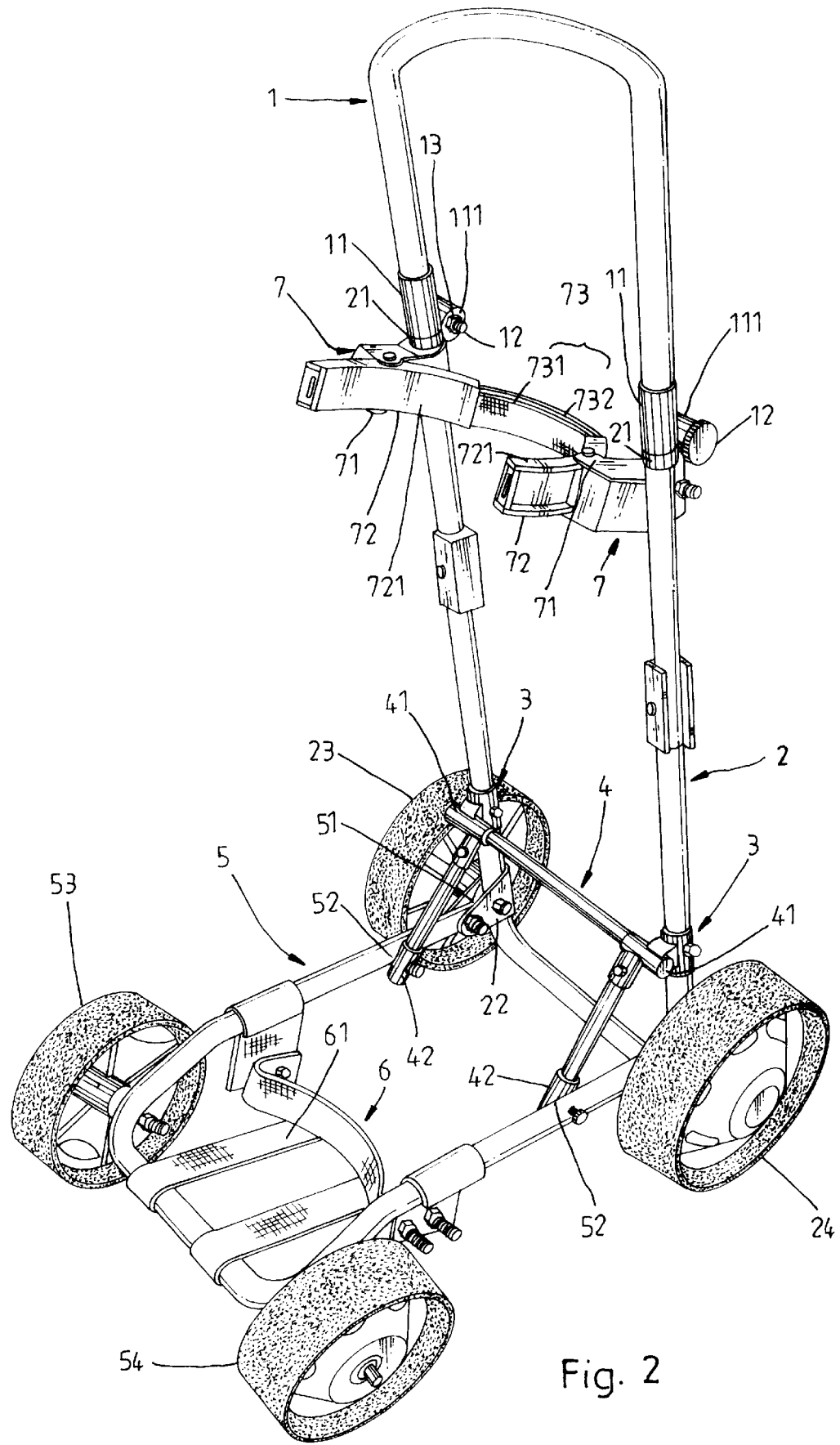
FIG. 2 is a perspective view of a folding collapsible golf cart according to the present invention.
Figure 3:
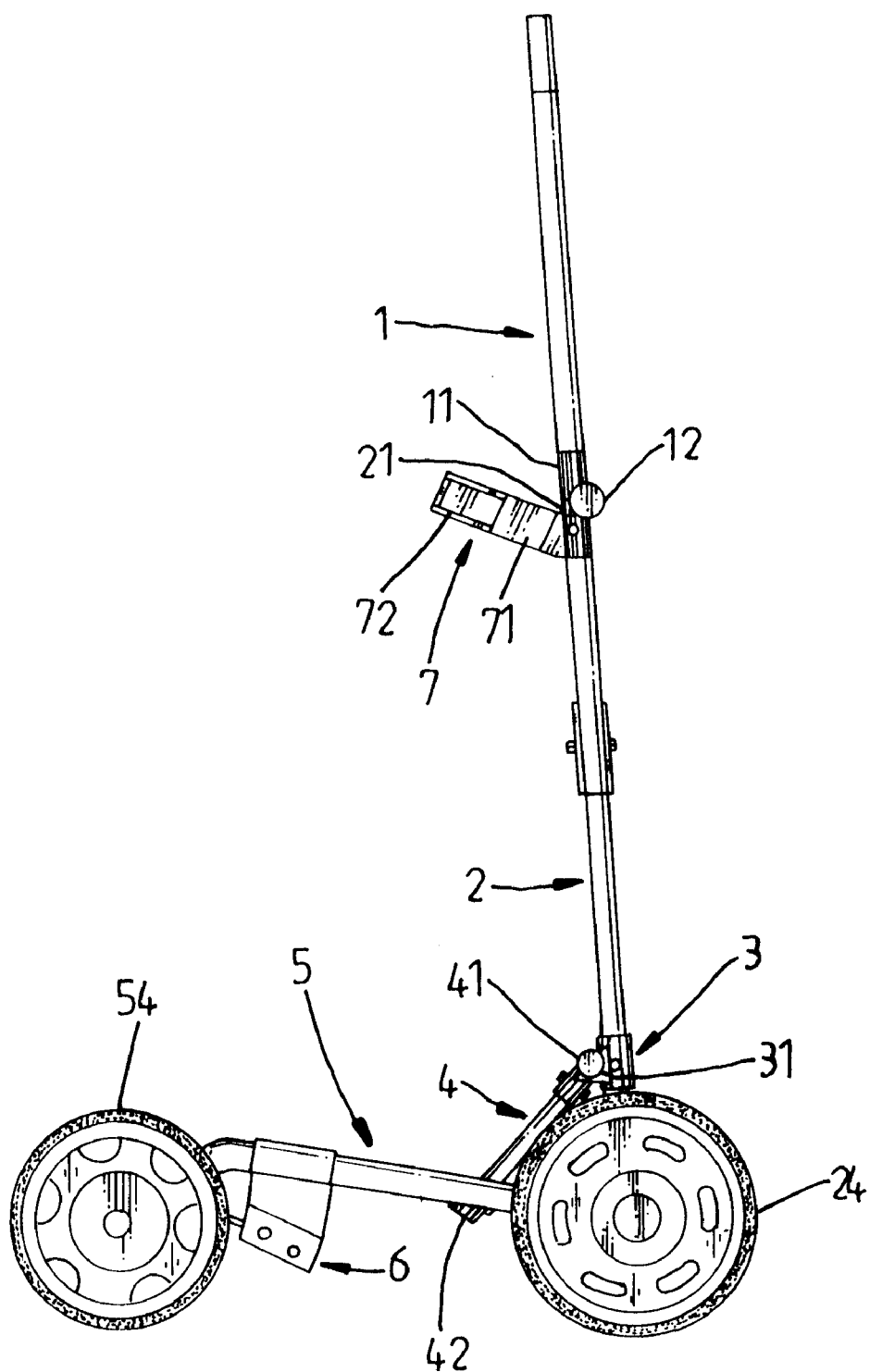
FIG. 3 is a side view of FIG. 2.

When the folding collapsible golf cart is set in the operative position as shown in FIGS. 2 and 3, the transverse locating frame tube 41 of the brace member 4 is rested on the horizontal grooves 31 on the locating frames 3 to supporting the substantially U-shaped upright frame 2 in vertical, and the golf bag can be directly put in the bottom golf bag cradle 6 and secured to the top golf bag cradle 7.

Figure 4:
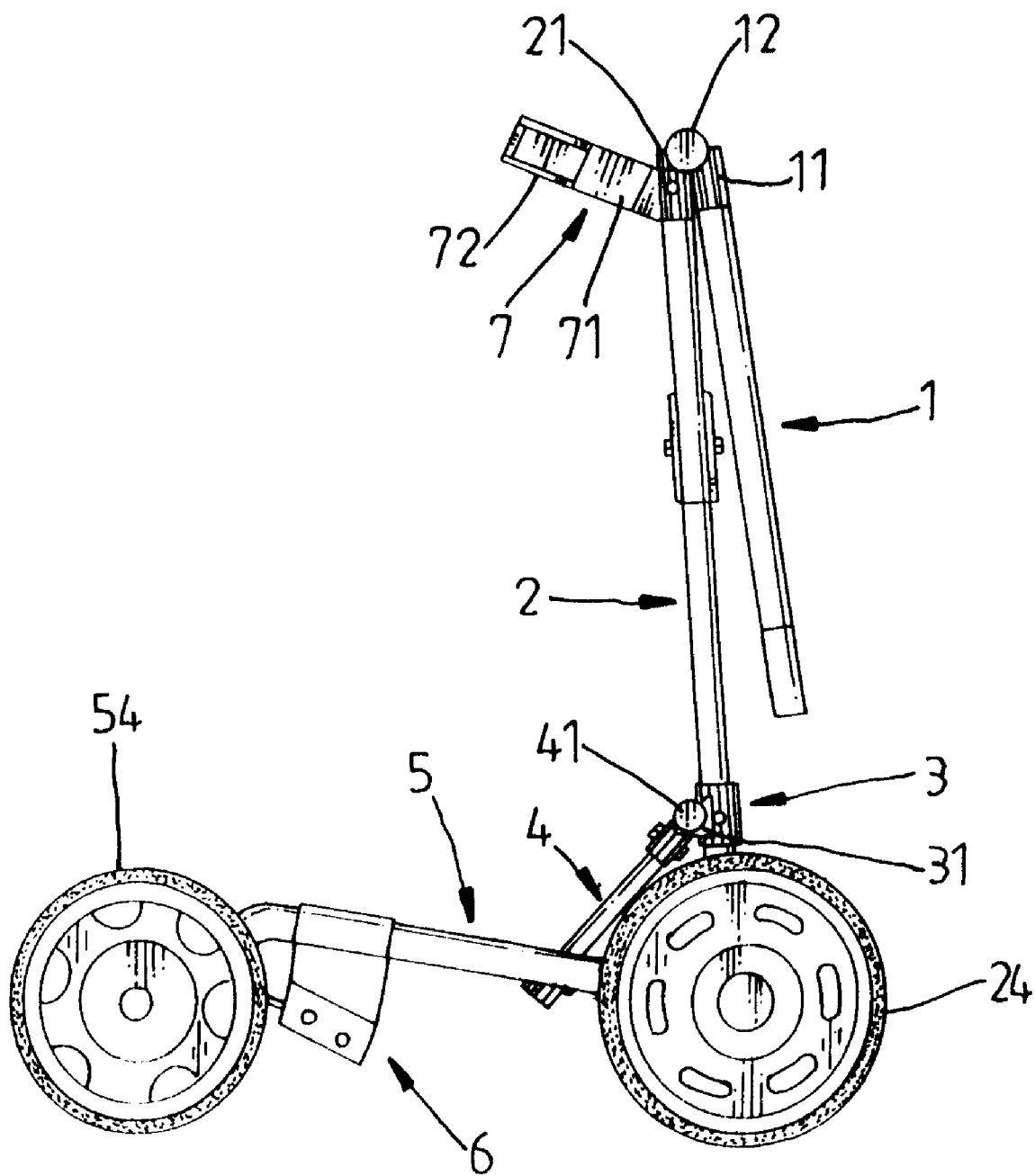
FIG. 4 is similar to FIG. 3 but showing the handle folded up and attached to the upright frame.
Figure 6:
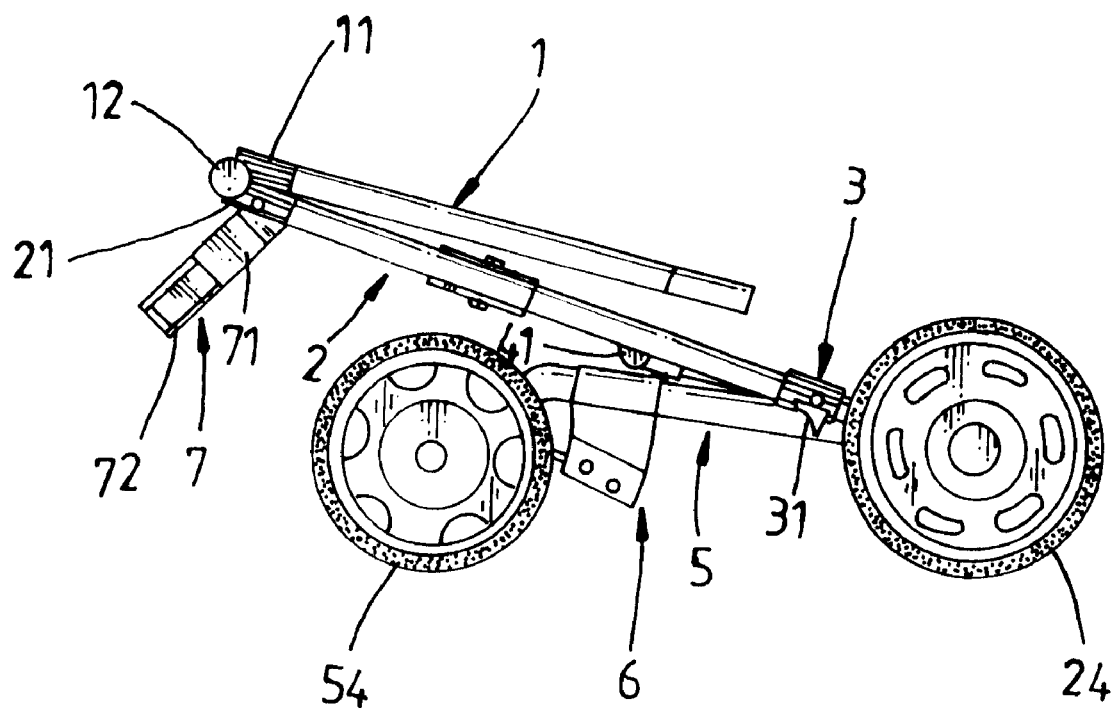
FIG. 6 shows the folding collapsible golf cart collapsed according to the present invention.

Referring to FIGS. 4, 5 and 6 again, when not in use, the folding collapsible golf cart can be folded up and collapsed by: loosening the adjustment screws 12, then turning the substantially U-shaped handle 1 downwards, permitting the substantially U-shaped handle 1 to be closely attached to the substantially U-shaped upright frame 2 (see FIG. 4), then disconnecting the transverse locating frame tube 41 of the brace member 4 from the horizontal grooves 31 of the locating frames 3, permitting the brace member 4 to be turned downwardly forwards and closely attached to the top side of the substantially U-shaped base frame 5 (see FIG. 5), and then the substantially U-shaped upright frame 2 and the substantially U-shaped handle 1 are turned downwardly forwards and closely attached to the top side of the substantially U-shaped base frame 5 (see FIG. 6). When in use, the aforesaid procedure is operated reversely, and the whole assembly of the folding collapsible golf cart is returned to the operative position shown in FIG. 2.

I claim:

1. A folding collapsible golf cart comprising:

a substantially U-shape upright frame made from a U-shaped frame tube, said upright frame having one mounting block at each end thereof, a cylindrical coupling block respectively raised from each mounting block of said upright frame and defining a respective axle hole, and a lug bilaterally disposed at each bottom side;

a substantially U-shaped handle made from a U-shaped frame tube, said handle having one mounting block at each end thereof, and a cylindrical coupling block respectively raised from each mounting block of said handle and defining a respective axle hole;

two adjustment screws respectively inserted through the axle holes on the cylindrical coupling blocks of the mounting blocks of said upright frame and said handle and fasten with a respective nut to secure the coupling blocks of said handle to the coupling blocks of said upright frame, permitting said handle to be turned about an axis between an operative position where said handle and said upright frame are longitudinally aligned, and a non-operative position where said handle folded up and closely attached to said upright frame;

a substantially U-shaped base frame made from a U-shaped frame tube, said base frame having two ends respectively pivoted to the lugs at the bottom side of said upright frame;

two front wheels bilaterally mounted on said base frame remote from said upright frame supporting said base frame on the ground;

two rear wheels bilaterally mounted on said upright frame supporting said upright frame on the ground;

two locating frames respectively fixedly fastened to said upright frame above said lugs, said locating frames each having a horizontal groove;

a brace member pivoted to said base frame supporting said upright frame on said base frame in vertical position, said brace member comprising a transverse locating frames, and two parallel coupling frame tubes perpendicularly extended from said transverse locating frame tube and respectively pivoted to said base frame at two opposite sides; and a bottom golf bag cradle and a top golf bag cradle respectively mounted on said base frame and said upright frame for securing a golf bag on the folding collapsible golf cart, said bottom golf bag cradle having a bottom sloping downwardly and backwardly for holding the loaded golf bag in a tilted position, said top golf bag cradle comprising two mounting frames respectively fastened to the ends of said upright frame, two supporting frames respectively pivoted to said mounting frames, said supporting frames each having a smoothly curve supporting face for supporting the loaded golf bag in place, and a connecting device connected between said supporting frames and said mounting frames, said connecting device comprising a front elastic belt and a rear resilient belt connected in parallel between said supporting frames.

2. The folding collapsible golf cart of claim 1, wherein each cylindrical coupling block of said handle has a front chamber and a plurality of radial grooves at a front side thereof; each cylindrical coupling block of said upright frame has a front chamber and a plurality of radial grooves at a front side thereof, the radial grooves of the cylindrical coupling blocks of said upright frame being respectively retained engaged with the radial teeth of the cylindrical coupling blocks of said handle to stop said handle and said upright frame from movement relative to each other when said adjustment screws and said nuts are fastened tight; each spring is respectively mounted in the front chambers between each cylindrical coupling block of said handle and each cylindrical coupling block of said upright frame and imparting an outward pressure to force the cylindrical coupling blocks of said handle a part from the cylindrical coupling blocks of said upright frame apart when said adjustment screws and said nuts are loosened, for permitting said handle to be turned from said operative position to said non-operative position.

* * * * *